Patented Aug. 30, 1938

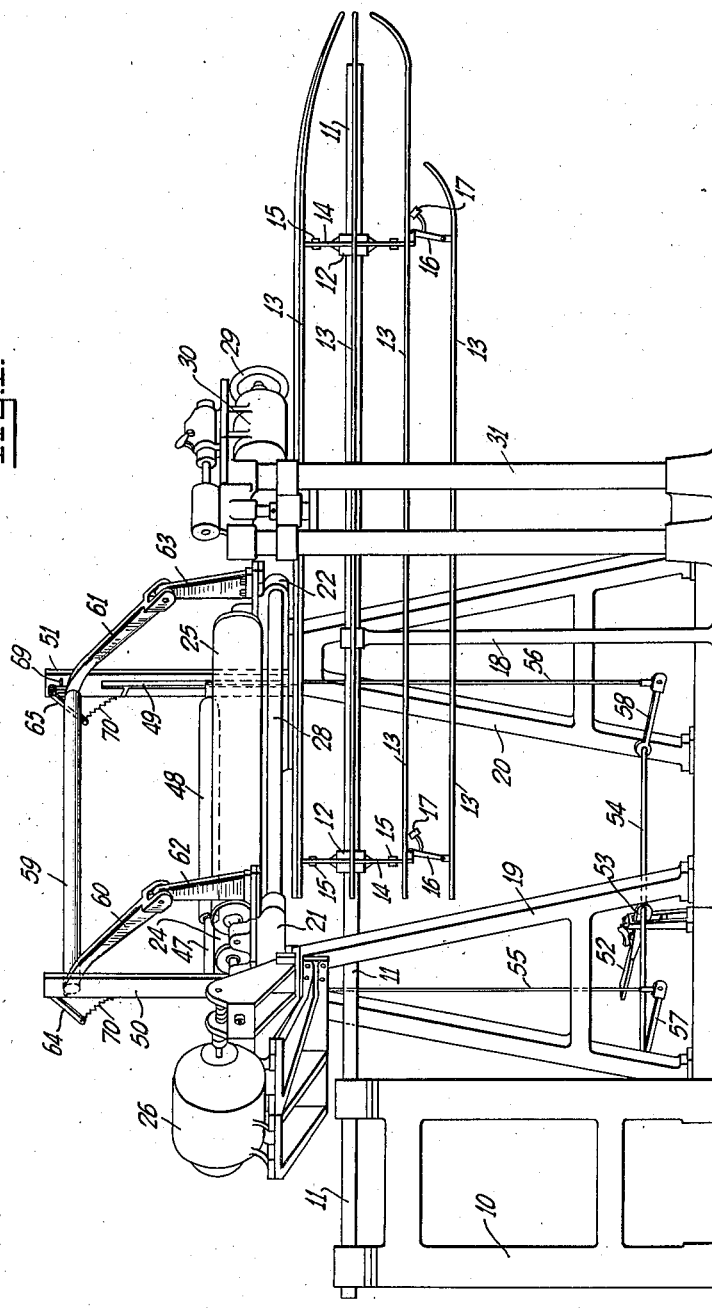

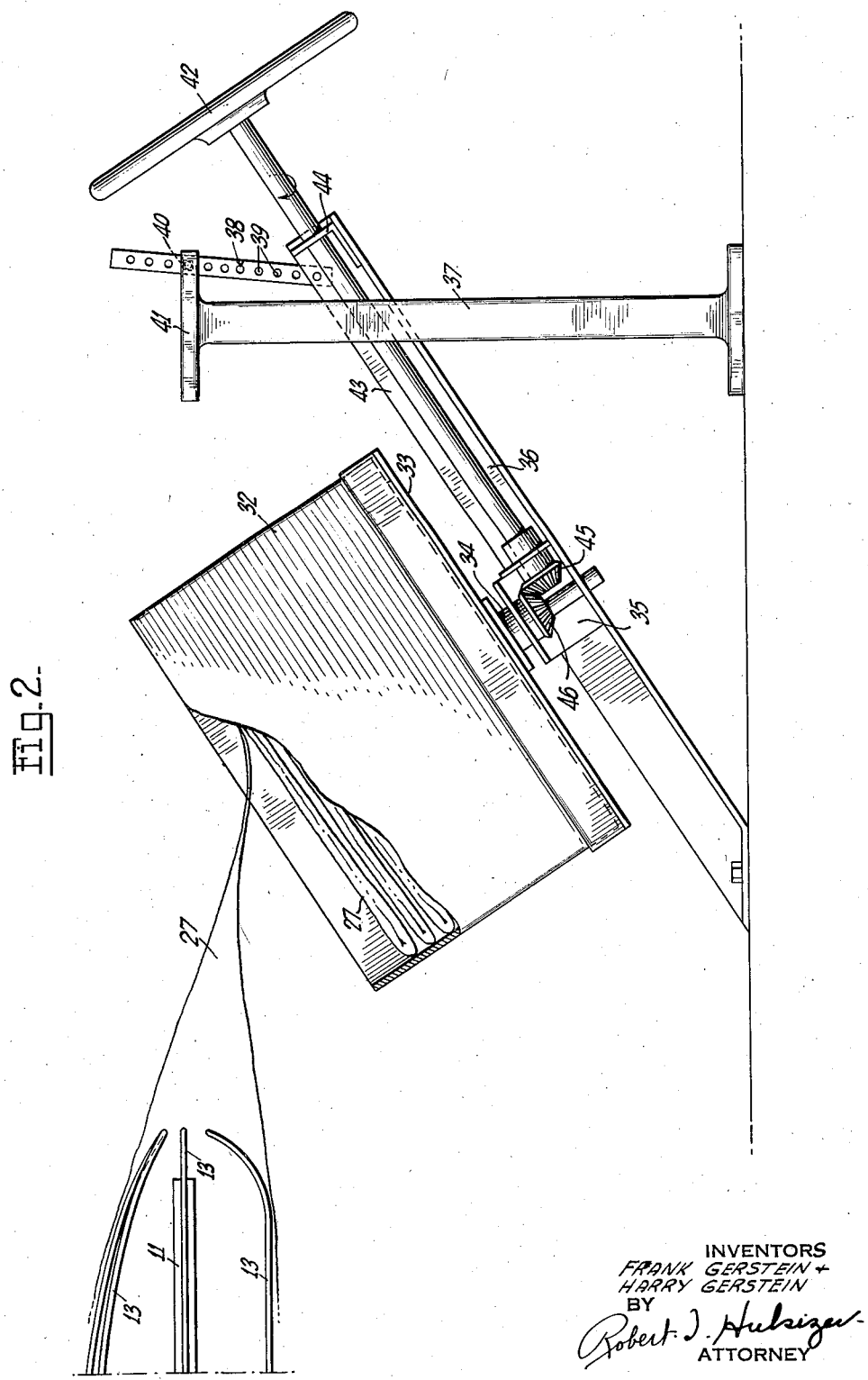

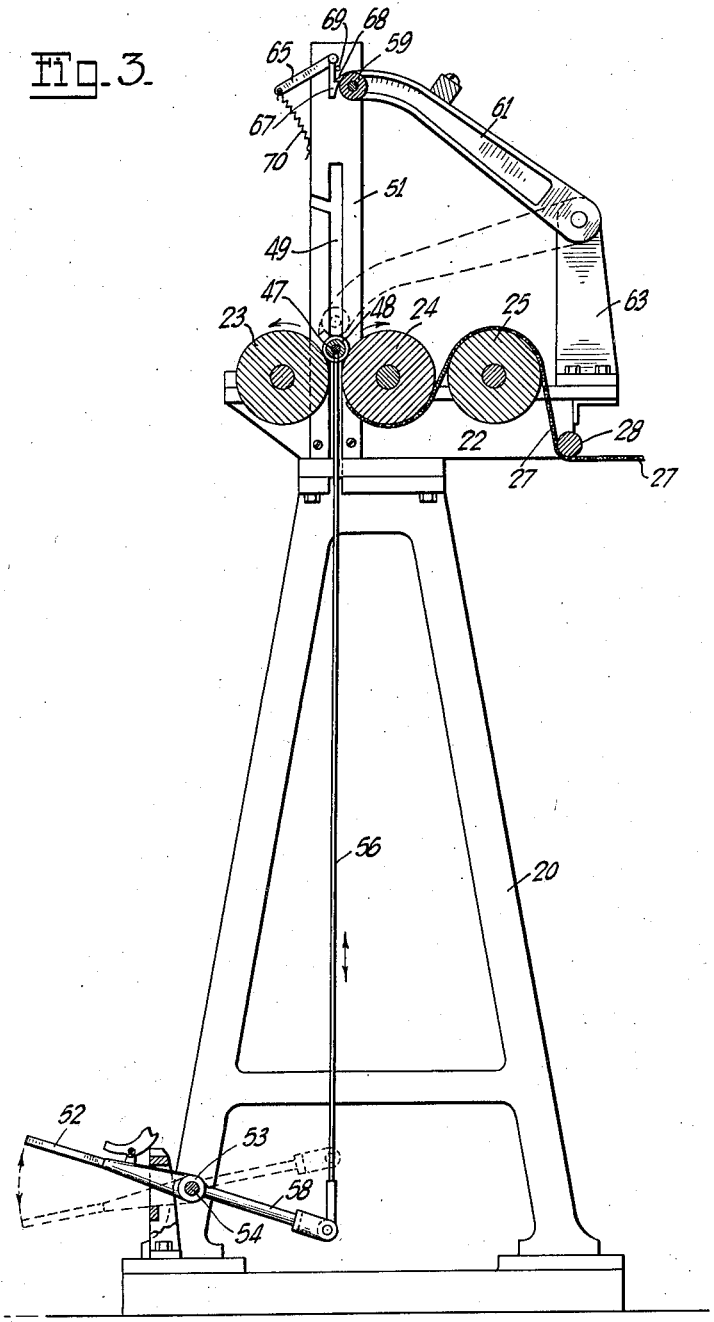

2,128,481

UNITED STATES PATENT OFFICE 2,128,481

BIAS CUTTING AND WIND-UP APPARATUS

Frank Gerstein and Harry Gerstein, New York, N. Y., assignors to The Lever Bias Machine Corporation, New York, N. Y., a corporation of New York Application October 22, 1935, Serial No. 46,066

7 Claims. (Cl. 164—61)

This invention relates to machines for cutting material on the bias and has particular reference to a machine in which the tubular material is drawn off a rotatable support over a mandrel in a spiral direction and pulled off of and advanced over the mandrel by a device which simultaneously winds up the material, and a knife cutting the material on the bias as it passes over the mandrel.

The main object of the invention is to improve the apparatus especially with respect to the passage of the material from the material support to the mandrel so that the minimum of pull is required to move the material from its support on to said mandrel.

A further object is to improve the mandrel itself so that it can operate as efficiently with simpler construction and cooperate with the material support to pass the goods from one to the other with the least tendency to warp or twist the material as it advances spirally from the support across the mandrel.

Another object is to reduce the number of operations required in handling the material from the time it is sewed in tubular form until it is passed to the mandrel and also to save labor and expense in such handling while at the same time greatly increasing the quality and speed of production of the product resulting from the machine.

Further and more specific objects, features, and advantages will more clearly appear from a consideration of the specification hereinafter when taken in connection with the accompanying drawings which form part of the specification and which illustrate a present preferred form which the invention may assume.

Briefly considered and in general terms the invention comprises a combination of the following elements:

1. A mandrel provided with a plurality of material engaging bars some of which are more or less permanently adjustable to define the general tubular diameter of the mandrel and one of which is automatically adjusted by gravity action and contact pressure with the material passing over the mandrel to maintain the tubular goods in a steady state of tension as it passes over the mandrel.

2. A freely rotatable support for the material before it goes on the mandrel in the form of a platform preferably turned by hand and adapted to receive an open face container such as a box or case containing the material disposed loosely therein in loose untwisted folds as it has dropped therein from the sewing machines which have sewed the material into the tube, prior to its being passed onto the mandrel to be cut on the bias. The container is disposed preferably at an angle to the horizontal with its open top inclined toward the adjacent end of the mandrel so that as it rotates the lower edge of the top is always slightly below the line of travel of the material as it is pulled out of the box on to the mandrel.

3. A wind-up and pull off apparatus which is disposed to pull the material across and over the mandrel in a spiral manner and off the mandrel between suitable rollers onto a cored roll upon which the material is wound up with a practically perfect lateral edge which eliminates the necessity of shaving the ends after the winding is completed and thus saves large amounts of material and labor and time.

It is to be noted that the only means for moving the material through the apparatus is the pull exerted thereon by the wind-up mechanism. It will also be noted that the weight of the material being wound up is the very pressure which creates the necessary tension in the goods to not only wind it up but also to pull it over and off the mandrel. While all this is taking place it is absolutely essential that the pulling tension be absolutely even and regular and as steady as possible and as small as possible because any variation in the tension in the goods will cause it to be cut unevenly and also to wind up unevenly thereby necessitating costly and wasteful shaving of the ends of the wound roll.

With the features above enumerated adopted into the improved machine it is found that the goods can be wound up faster, with a minimum thereon, and with a wound edge which practically eliminates shaving of the ends. Furthermore it will be obvious that when the material on the rotatable support is in rolled up condition and has to be pulled off a heavy roll onto the mandrel, there is a decided limit to the size of roll which can be thus handled whereas when the material drops from the sewing machine loosely into a box or container which is then placed on the rotary platform to be associated with the machine, the material can then be pulled out of the box without practically any effort or strain on the material and therefore the length of material which can be thus handled is only limited by the capacity of the box or container. It has been found that much greater lengths of material can be handled in this way with even less effort or strain on the pulling mechanism.

The present preferred form which the invention may assume is illustrated in the accompanying drawings of which Fig. 1 is a side elevation of the mandrel, the cutter, and the wind-up device;

Fig. 2 is a side elevation of the rotatable support for the material to be advanced over the mandrel; and, Fig. 3 is a vertical section through the machine at the wind-up mechanism.

In the drawings the present preferred form which the invention may assume, comprises a pedestal 10 from which a shaft 11 extends horizontally. This shaft supports a plurality of spider plates 12 on the periphery of which a plurality of longitudinally extending bars 13 are mounted to form the outline of a mandrel over which material is to be advanced. Some of these bars are more or less permanently adjustable to desired positions by means of being supported on arms 14 which slide in the spider frames 12 and are adjusted by means of set screws 15. One of these mandrel arms, preferably the lowermost one, is supported from the arms 14 by means of a pivot arm 16 counterbalanced by a gravity operated counterweight 17 which tends to keep the bar in its lowermost or outermost position at all times. This will cause a steady even pressure on the material which is spirally passing over the mandrel and therefore exert a constant tension on it and therefore tends to keep it passing over the mandrel in a perfectly even state of tension and practically constant diameter. At a point where the goods leave the mandrel to pass to the wind-up device the shaft 11 may be suitably supported by an auxiliary pedestal 18.

The ends of the mandrel which first receive the material to be cut on the bias are bent inward toward each other as shown in the figures so that the bars 13 thus shaped will permit the easy and ready entry of the tubular goods on to the mandrel. In this manner the entry of the goods onto the mandrel from the rotatable support is effected without any tearing or undue friction which might create an abnormal drag on the wind-up device, and vary the character of the roll being wound up.

Adjacent the mandrel are disposed a pair of spaced pedestals 19 and 20 on the top of which are disposed side plates 21 and 22 supporting rollers 23, 24, and 25. These rollers are mechanically connected to and driven by a motor 26, in any desired manner not shown, but preferably in the manner shown in U. S. Patent 1,955,282, on which this invention is an improvement. Generally speaking the rollers 23 and 24 are positively driven by suitable gearing in the direction indicated by arrows in Fig. 3, and the roller 25 is an idler roller over which the material 27 passes from beneath a small tension roller 28 which is disposed about on a level with the top of the mandrel. Preferably the rollers 23, 24, and 25 are disposed at an angle of 45 degrees with respect to the length of the mandrel as that is the angle at which the goods are cut by the knife 29 which is mounted on the shaft of a motor 30, supported on a pedestal 31 fastened to the floor or any other suitable support.

The material before it passes to the mandrel is preferably disposed in a loosely folded condition as shown in Fig. 2 in a box or casing 32, mounted on a rotatable plate or support 33, on a shaft 34, journalled on bracket 35 fastened to an inclined frame beam 36 fastened at one end to the floor and at the other end adjustably to an upright pedestal member 37. The adjustability of the beam 36 is by means of a link 38 with holes 39 therein which can be engaged with a suitable pin 40 on the top plate 41 of the pedestal 37 to determine the angle of the beam 36.

A hand wheel 42 operates a rotatable shaft 43 journalled in bracket plates 44 and 35 and having a bevel gear 45 meshing with a bevel gear 46 on the lower end of the shaft 34.

In Figure 3 is shown the apparatus for facilitating the handling of the roll of material which is being wound up. It comprises a core bar or rod 47 over which is slipped a tube of card board 48. The ends of this rod 47 lie in slots 49 formed in the adjacent faces of the pedestal plates 50 and 51. The end of the material 27 is wrapped around the core bar and to permit this initial operation the core bar is lifted by depressing a pedal 52 pivoted at 53 on the pedestals 19 and 20 by means of rod 54. The other end of the pedal 52 is connected to links 55 and 56 through the intermediary of the rod 54 and the arms 57 and 58. The upper ends of the links 55 and 56 lie under the ends of the core bar 47 and when the pedal 52 is depressed the core bar is lifted enough so that it is easy to wrap the material around the core bar to permit the material to start winding up on the bar.

In order to keep the material on the wind-up roll in proper tension it is necessary to have an element press down on the material while it is being wound up so that it will not be wound up too loosely and to this end there is provided a presser bar or roller 59 rotatably mounted on the ends of arms 60 and 61 pivoted to pedestals 62 and 63. At the top of pedestals 50 and 51 are disposed pivoted latch levers 64 and 65 having latch elements 66 and 67 to engage with ears 68 on the ends of the arms 60 and 61. Stop pins 69 prevent undue movement of the latch 69 and springs 70 give the latch elements a directional bias as shown.

Turning now to a general description of the operation of the method and the apparatus which embodies this novel and practical and highly advantageous method, we will note that the material is taken in flat form and sewed into a tubular piece which is common in the trade, but the material when thus formed is then allowed to drop naturally into a box or container such as 32 so that it assumes, without any outside help, a natural folded loose position in the box. This is particularly true since preferably the inclination of the platform on which the box is rotatably disposed is such as to present the open upper face of the box inclined toward the adjacent end of the mandrel with its lower edge below the line of travel of the goods from the box on to the mandrel whereby no resistance is offered by the box edge to such movement of the goods. The box or container 32, with the loosely folded material lying therein is then taken and placed on the support or rotating table or platform 33 and fastened in place in any desired manner. The material is then led by hand onto the mandrel in opened condition so that the tube surrounds the mandrel bars 13 and is held in proper tension by the automatic expansibility of the lower bar previously described. The knife 29 is then started and the material is cut while being turned sufficiently in a spiral direction to allow an end of the cut material to extend to the windup apparatus. This apparatus is prepared to receive the material by pressing down the pedal 52 which raises the core bar 47 and allows the end of the material to be wrapped a few times around the core bar after which it is then allowed to drop so that the bar rests upon the rollers 23 and 24. After this the presser bar 59 is released by lifting latch member 68 therefrom and allowing it to drop and rest upon the top of the core bar 47. When these operations have taken place then the knife motor 30 and the windup motor 26 are started and the single operator stands at the hand wheel 42 and turns the table 33 in rotative synchronism with the speed of pull exerted on the goods by the wind-up device. Thus the material is pulled over and across the mandrel by the windup alone and the tension in the goods to so pull and draw it is created by the very weight of the material itself in addition to the weight of the presser bar 59. The pull of the windup on the goods is the only tension exerted thereon and is substantially constant since no other tension is exerted on the goods except this pull and the steady frictional resistance on the goods of the mandrel bars 13. There is substantially no resistance exerted on the goods at the starting end because the goods are so loosely disposed in the box 32 that practically no force is required to pull the goods out of the box except the very small weight of that particular fold of the goods which is being lifted at any given instant of time.

Because of this absence of any appreciable variation in force exerted on the goods during the cutting and windup, the goods are wound up with extreme evenness and therefore the necessity to shave the ends and thus waste material is practically eliminated and this may amount to the saving of thousands of dollars worth of material in a year, not to mention the saving of time in the completion of the process and the saving of labor costs. Also the usual previous method has required that the material be taken from the box after it is sewed and wound up on a roll before being taken to the cutting and windup machine. These steps are also saved since the material is now taken right in the box and fed to the cutting machine right from the box. When the given, but much larger than usual, length of material is completely cut and wound up on a roll the pedal 52 is lifted after the presser bar 59 is raised to its inoperative position and then the roll can be moved out of the slots 49 by means of the lateral passages therein and the material slid off the core bar which is then placed back in the machine ready for another operation.

While the invention has been described in detail and with regard to a present preferred form which the invention may assume, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What we claim as new and desire to secure by Letters Patent of the United States is:

1. In combination a mandrel to receive tubular material, an inclined rotatable support disposed adjacent the receiving end of the mandrel, and a container to be disposed on said support with its open upper face inclined toward the adjacent end of the mandrel, said container having therein tubular material in loosely folded untwisted condition.

2. In combination a mandrel to receive tubular material, an inclined rotatable support disposed adjacent the receiving end of the mandrel, and a container to be disposed on said support with its open upper face inclined toward the adjacent end of the mandrel, said container having therein tubular material in loosely folded untwisted condition, the inclination of the container being such that the material is drawn therefrom substantially without interference by the edges of the open end of the container.

3. A bias cutting machine which includes a rotatable inclined support and a container removably disposed thereon, said container having therein tubular material in loosely folded untwisted condition, a mandrel disposed adjacent the support to receive the tubular material, said support and said container disposed thereon being disposed or inclined toward said mandrel whereby said material may be fed to said mandrel from said container with a minimum of resistance.

4. In combination a mandrel to receive tubular material, an inclined rotatable support disposed adjacent the receiving end of the mandrel, and a container to be disposed on said support with its open upper face inclined toward the adjacent end of the mandrel, said container having therein tubular material in loosely folded untwisted condition, means on the mandrel to maintain an even tension in the tubular material, means to cut the material on the bias, and means to wind up the cut material, said wind-up means constituting the only means for pulling the material out of the container and across the mandrel.

5. In combination a mandrel to receive tubular material, an inclined rotatable support disposed adjacent the receiving end of the mandrel, and a container to be disposed on said support with its open upper face inclined toward the adjacent end of the mandrel, said container having therein tubular material in loosely folded untwisted condition, the inclination of the container being such that the material is drawn therefrom substantially without interference by the edges of the open end of the container, means on the mandrel to maintain an even tension in the tubular material, means to cut the material on the bias, and means to wind up the cut material, said wind-up means constituting the only means for pulling the material out of the container and across the mandrel.

6. In combination a mandrel to receive tubular material, an inclined rotatable support disposed adjacent the receiving end of the mandrel, and a container to be disposed on said support with its open upper face inclined toward the adjacent end of the mandrel, said container having therein tubular material in loosely folded untwisted condition, means on the mandrel to maintain an even tension in the tubular material, means to cut the material on the bias, and means to wind up the cut material, the weight of the material being wound up creating substantially all of the tension in the material necessary to pull it out of the container and across the mandrel in a spiral direction.

7. A bias cutting machine which includes a rotatable inclined support, manual means for rotating said support, a container removably disposed on said support, said container having therein tubular material in loosely folded untwisted condition and means for adjusting the inclination of said support, a mandrel disposed adjacent the support to receive the tubular material, said support and said container disposed thereon being disposed or inclined toward said mandrel whereby said material may be fed to said mandrel from said container with a minimum of resistance.

FRANK GERSTEIN.
HARRY GERSTEIN.